Oct. 19, 1948. J. H. LESLIE, II, ET AL 2,451,623
ENGINE OPERATED HOT AIR HEATER
WITH ENGINE DEMOUNTING MEANS
Filed Dec. 8, 1943 5 Sheets-Sheet 1
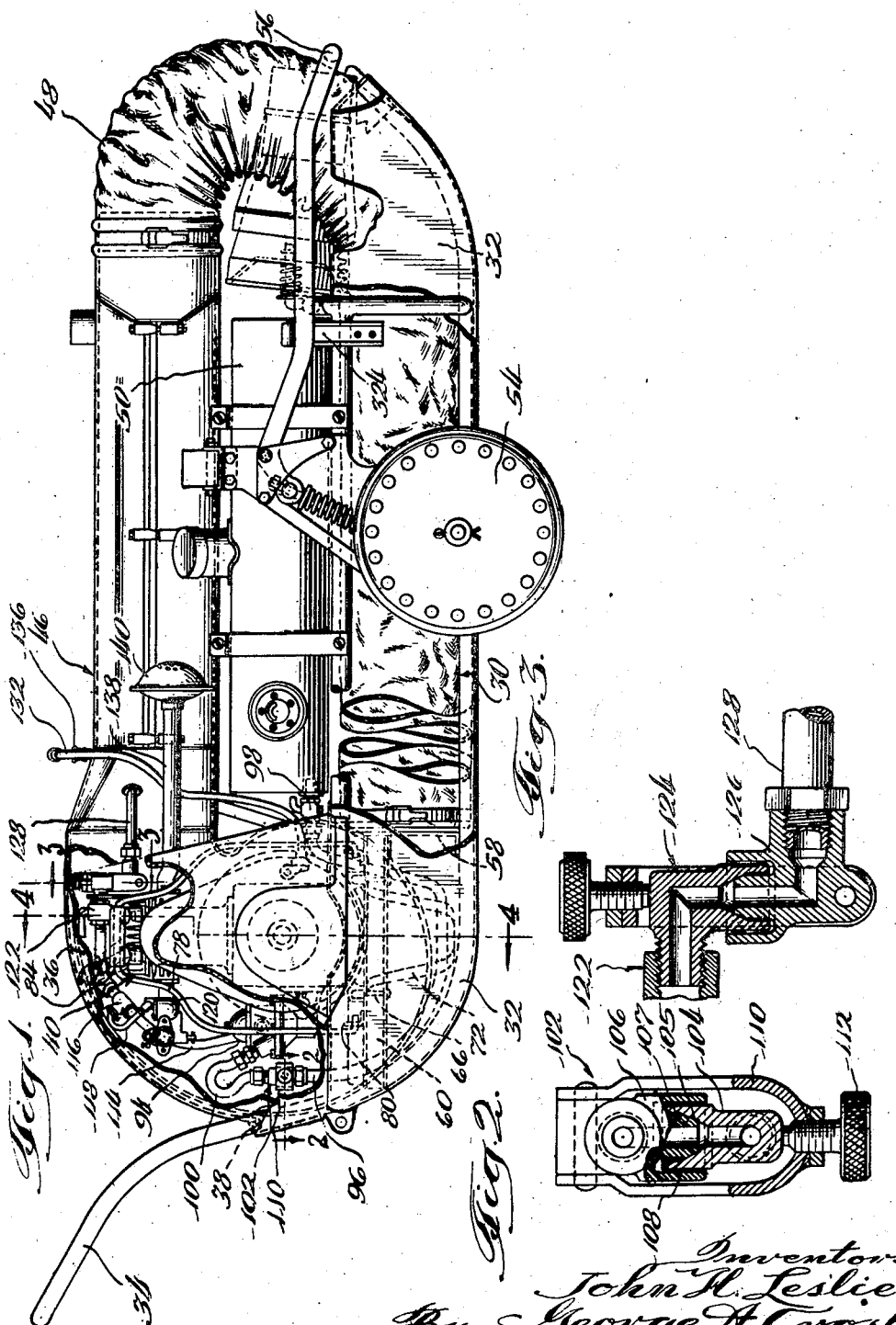

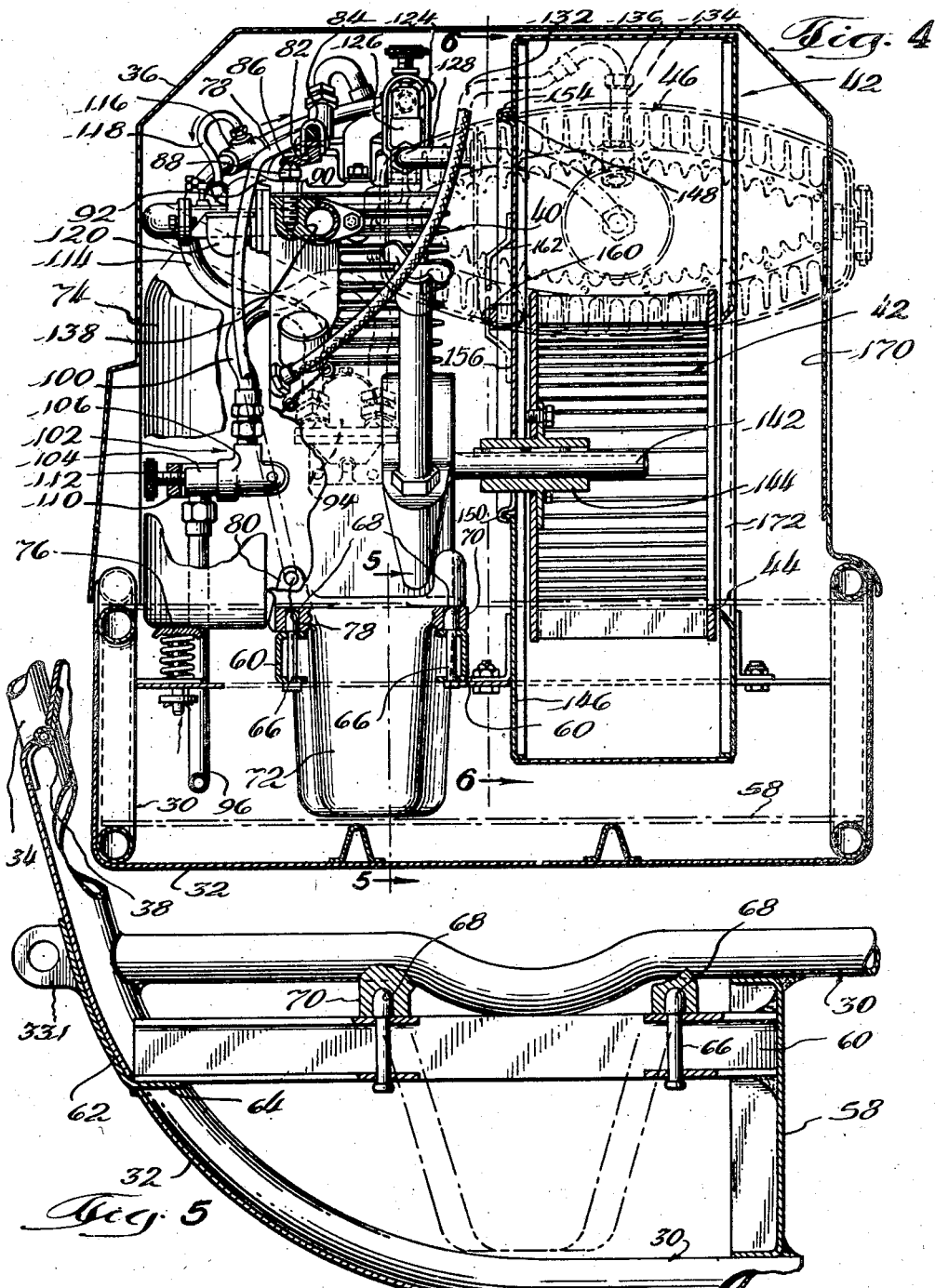

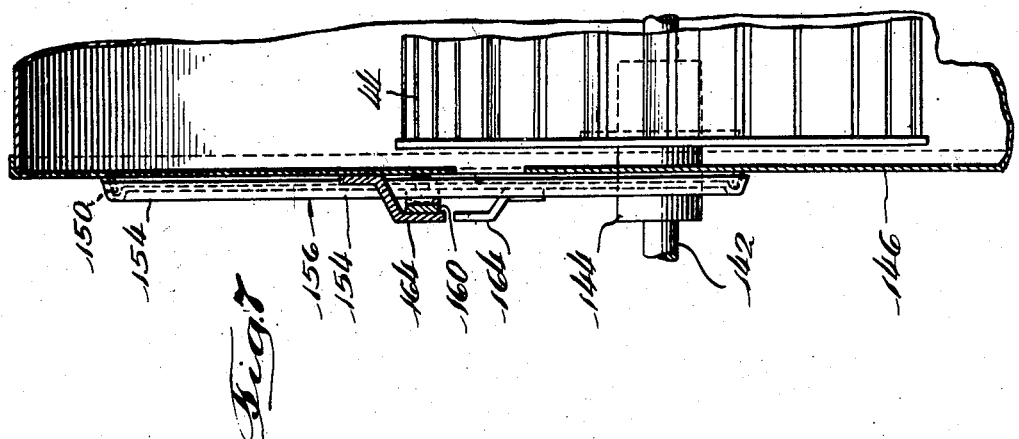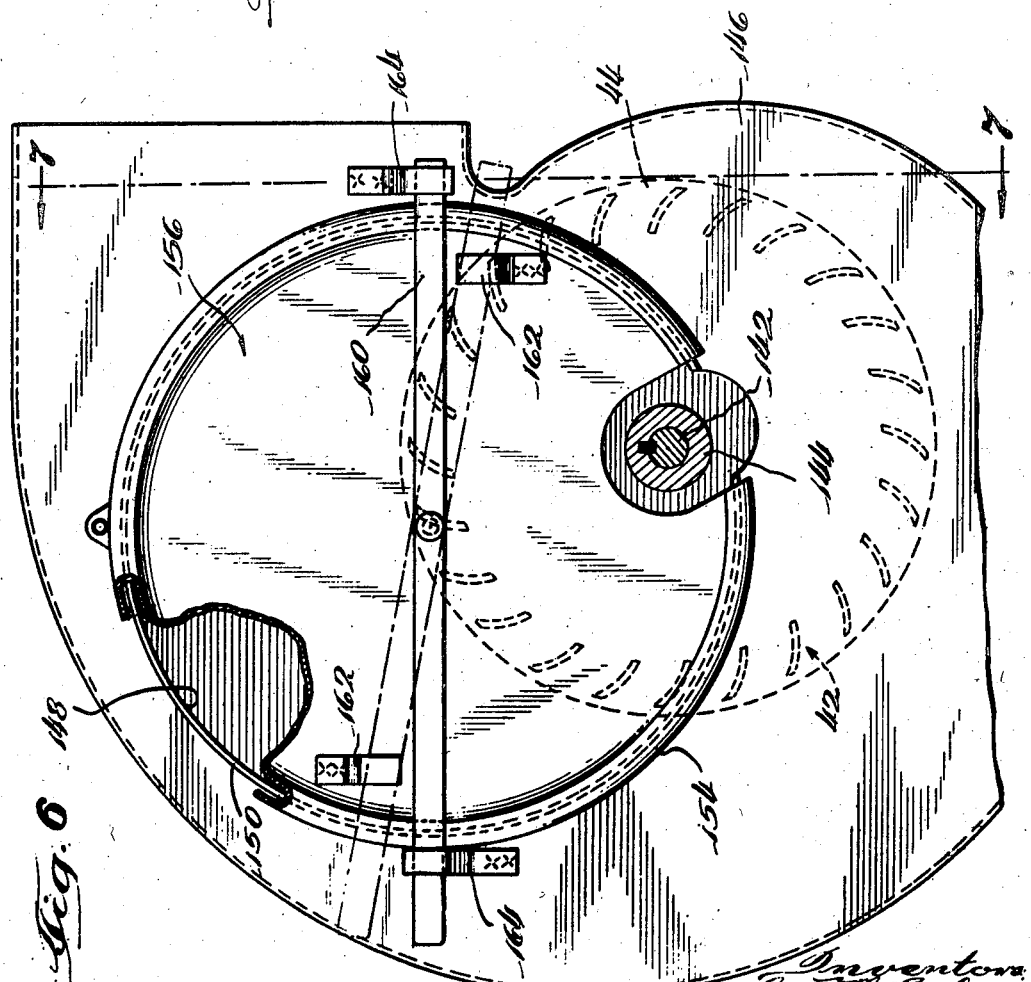

Oct. 19 1948.   J. H. LESLIE, II, ET AL   2,451,623
ENGINE OPERATED HOT AIR HEATER
WITH ENGINE DEMOUNTING MEANS
Filed Dec. 8, 1943   5 Sheets-Sheet 4
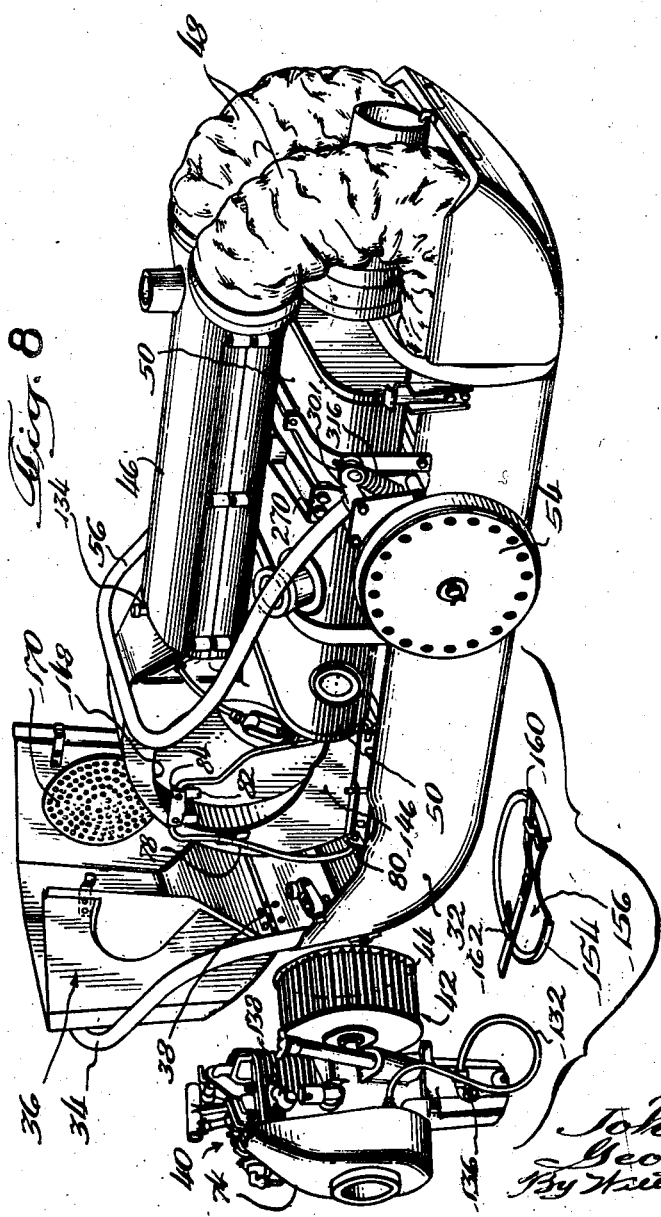

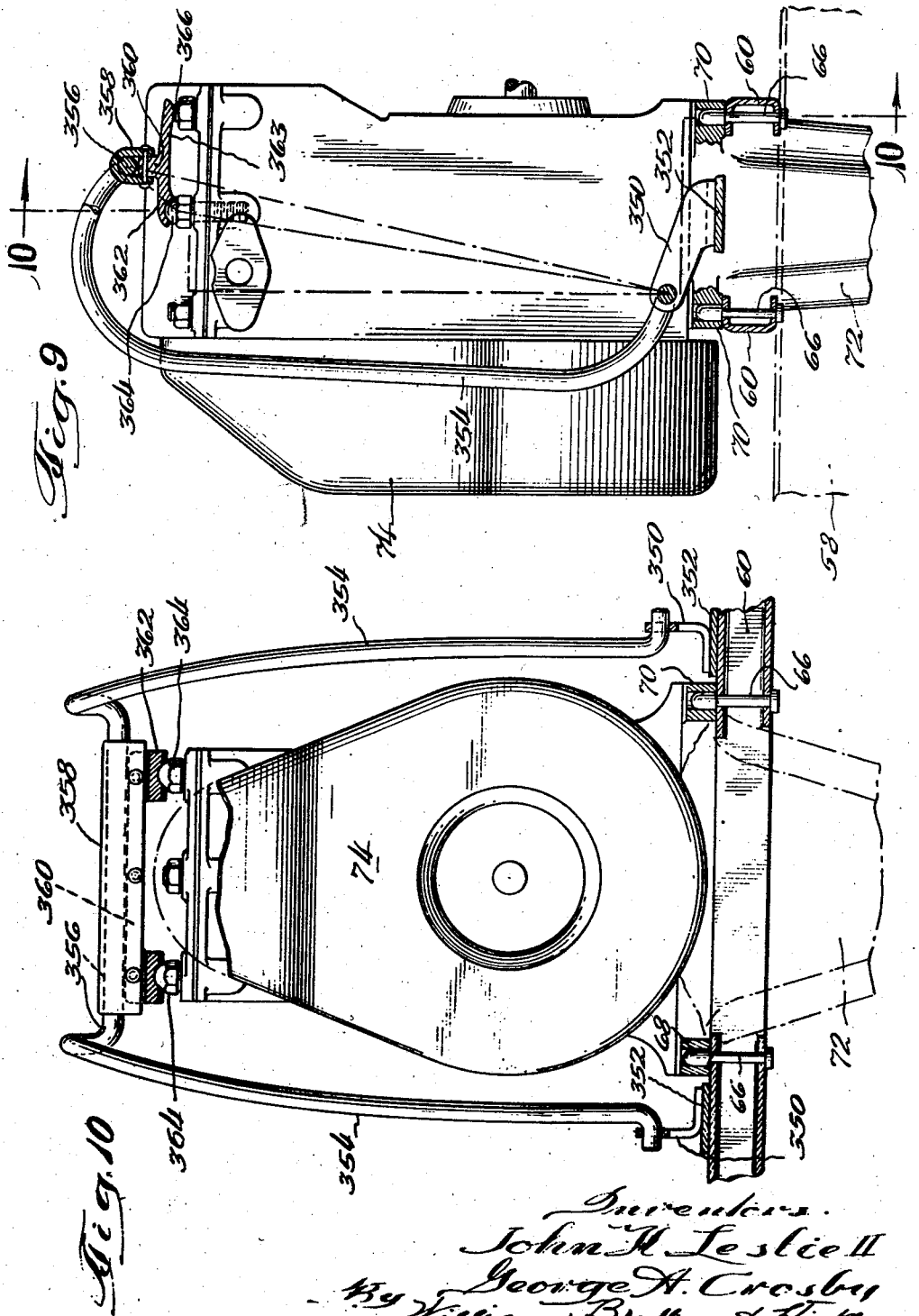

Patented Oct. 19, 1948

2,451,623

UNITED STATES PATENT OFFICE 2,451,623

ENGINE OPERATED HOT-AIR HEATER WITH ENGINE DEMOUNTING MEANS

John H. Leslie, II, Winnetka, and George A. Crosby, Park Ridge, Ill., assignors to Stewart-Warner Corporation, Chicago, Ill., a corporation of Virginia Application December 8, 1943, Serial No. 513,368

7 Claims. (Cl. 126—110)

Our invention relates generally to heaters, and more particularly to portable heaters usable at air fields and in military operations to supply air at a high volumetric rate and at high temperature to heat the engines and other parts of aircraft, to thaw out vehicles, and for similar purposes.

In the operation of air bases in northern latitudes, particularly in winter, great difficulty has been experienced in conditioning aircraft for take-off due to the fact that the engines and other parts of the aircraft become literally frozen, that is, the oil congeals and the metal parts contract to such extent that it is substantially impossible to start the engines. It has been found necessary to provide some means for at least partially enclosing the engines and to supply heated air thereto.

At very low temperatures, it is essential that the heating means be capable of supplying heat at a high rate, and since there is a limitation upon the maximum permissible temperature of the heating air, it is essential that the heated air be supplied at a high volumetric rate. The heating apparatus of our invention is particularly designed for this purpose, and is capable of supplying large quantities of heat carried by air at a reasonably high temperature and at a high volumetric rate.

In apparatus of this type used in the past, difficulty has frequently been experienced in maintaining the heating apparatus in operation, since the apparatus includes an internal combustion engine which likewise presents starting difficulties in cold weather. Furthermore, such internal combustion engines, usually of the single cylinder type, are subject to failures in operation and occasionally require servicing. In the past, such servicing was rendered difficult by the position of the engine in the assembly and by the numerous connections between the engine and other parts of the apparatus which had to be severed prior to removal of the engine for servicing.

In the apparatus of our invention, this difficulty is overcome by making the engine readily detachable from the unit by simple operations, so that it is feasible, if an engine of one unit fails to operate properly, to remove the engine therefrom and substitute a spare engine in a few minutes' time, thus making it possible to continue use of the heater unit while the engine is being repaired or serviced.

A further object is to provide an improved heater unit assembly having an internal combustion engine for driving a blower, and in which the internal combustion engine with the rotor of the blower may readily be removed from the unit for replacement or servicing.

Other objects will appear from the following description, reference being had to the accompanying drawings, in which Fig. 1 is a generally side elevational view of the complete heater unit, portions of the external casing being broken away to show internal parts;

Fig. 2 is a fragmentary sectional view taken on the line 2—2 of Fig. 1, showing a detachable fuel line connection for the engine;

Fig. 3 is a fragmentary sectional view taken on the line 3—3 of Fig. 1, showing the detachable fuel line connection for supplying fuel to the heater;

Fig. 4 is a transverse sectional view taken on the line 4—4 of Fig. 1;

Fig. 5 is a sectional view taken on the line 5—5 of Fig. 4, and showing a detail of the chassis construction;

Fig. 6 is a transverse sectional view taken on the line 6—6 of Fig. 4, and showing particularly the blower casing;

Fig. 7 is a sectional view taken on the line 7—7 of Fig. 6;

Fig. 8 is a perspective view of the heater unit showing the engine, blower rotor, and rotor casing cover removed therefrom;

Fig. 9 is a sectional view of a modified toggle clamping means for securing the engine in the heater unit; and Fig. 10 is a sectional view taken on the line 10—10 of Fig. 9.

GENERAL DESCRIPTION

In general, the portable heater unit of our invention comprises a welded tubular frame 30, the lower portion of which is enclosed by a housing sheet 32 which is shaped in the manner of a toboggan or sled, so as to enable the unit to be pulled on snow, ice, or sand, or any terrain over which the unit could not be efficiently trundled on its wheels. Formed as a part of the tubular welded frame 30, is a handle 34. An engine cover housing 36 is hinged to the lower casing 32 by means of a hinge 38 the leaves of which may be welded respectively to the cover 36 and casing 32.

An internal combustion engine 40 is detachably secured to the chassis frame 30 by means hereinafter to be described in greater detail, the engine operating to drive a blower 42 having a rotor 44 (Fig. 4). The blower supplies air to be heated, as well as air for combustion, to a heater 46, the heated air from which is conveyed through flexible ducts 48 to the space to be heated. A fuel tank 50 is secured to the chassis frame beneath the heater 46 and the space beneath the fuel tank 50 forms a magazine for storage of the ducts 48 when the heater is not in use.

A pair of wheels 54 are individually spring mounted and are arranged to be moved from their lowered to a raised position by means of a handle 56 and a suitable intermediate operating mechanism.

*Engine and blower construction and mounting*

As best shown in Figs. 4 to 7, a cross channel 58 is welded to the tubular frame 30 and serves in part as a support for a pair of engine supporting channels 60 (Figs. 4 and 5) the other ends of these channels being supported by a reinforcing plate 62 which is welded to the housing 32 and has a ledge portion 64 extending through a suitable aperture in the housing 32. The channel members 60 have dowel headed pins 66 secured therein, the upwardly projecting heads of these pins being conformed for reception in sockets 68 formed in the base flange 70 of a crank case casting 72 forming part of the engine 40.

The flywheel housing 74 (Fig. 4) of the engine rests upon a resiliently mounted pad 76 to preclude the possibility of vibration and rattling. The engine 40 is held in position over the heads of the dowel pins 66 by a toggle bail 78, the lower ends of which are pivoted in cleats 80 secured to one of the channel frames 60, and the upper end of which carries a toggle bracket 82 pivoted to the cross bar of the bail by a strap 84. The toggle bracket 82 has a pair of socket depressions 86 formed therein for engagement with acorn nuts 88 threaded over the upper ends of cylinder head studs 90.

The engine toggle clamping mechanism is shown in Fig. 4 in clamped position, in which the cross piece of the bail has swung past dead center position, and in which the downwardly extending arms of the bail 78 abut against stop ears 92 projecting from the cylinder head. The bail 78 is preferably a steel rod which, due to its shape, has sufficient elasticity to permit the cross piece thereof to swing past dead center and to exert a large clamping force, holding the engine firmly against its supporting channels 60.

The engine has a fuel pump 94 (Fig. 1) driven thereby, this fuel pump drawing liquid fuel, such as gasoline, from the fuel tank 50 through a flexible hose 96. The hose 96 is connected to the fuel tank 50 through a stop cock 98 and is detachably connected to a gooseneck tube 100 by means of a detachable coupling connection 102.

This coupling connection 102 is shown in detail in Fig. 2, and comprises a female element 104, which is suitably connected to the hose 96, and a male element 106 which is connected to the tube 100. The coupling elements 104, 106 have complementary conical seating surfaces 105, 107, while the element 106 has a protecting flange 108. A yoke 110 is pivoted to the element 106 and has a thumb screw 112, the end of which is cooperable with the element 104 to force the elements 104 and 106 together and effect a fuel tight seal at the interengaging conical seating surfaces 105, 107.

The outlet of the fuel pump 94 has a conduit 114 connected thereto, this conduit being provided with a T 116 from which a branch conduit 118 leads to the float bowl 120 of the engine carburetor. The conduit 114 beyond the T 116 is provided with a shutoff cock 122 into which is threaded a female detachable coupling 124, the latter being clamped to the male fitting 126 in the manner previously described with reference to Fig. 2. The male coupling element 126 is connected by a conduit 128 with a fuel jet nozzle.

The engine is preferably provided with magneto type ignition. A shielded conductor 132 (Fig. 8) leads to a spark plug 134 forming part of the heater, the conductor being detachably secured to the spark plug by an easily operable coupling nut 136. The engine 40 may be of conventional construction and equipped with the usual appurtenances and accessories, such as an exhaust pipe 138, terminating in a muffler 140.

An extension 142 (Figs. 4, 6 and 7) of the engine crank shaft has the hub 144 of the blower rotor 44 keyed thereto so as to normally be removed with the engine, as indicated in Fig. 8. To permit such removal, the inner side wall 146 of the casing of the blower 42 has an opening 148 of sufficient size readily to permit passage of the rotor 44. The opening 148 is surrounded by a flange 150 which by interengagement with a grooved bead 154 formed around the periphery of a cover 156, locates the latter in position.

The cover 156 has a resilient locking bar 160 pivotally secured to the center thereof, the bar being normally held from bending by a pair of keepers 162 welded to the cover 156. In order to clamp the cover 156 in position, the bar 160 is swung counterclockwise from its dotted line to its full line position in Fig. 6, so as to cause its engagement beneath keeper brackets 164 which are welded to the blower housing shroud 146.

In order to remove the engine from the heater unit, the hinged cover 36 is swung upwardly to the position in which it is shown in Fig. 8, resting against the handle 34. The detachable coupling connections for the fuel line and spark plug are disconnected. The clamping bail 78 may then be pulled outwardly (to the left, Fig. 4) through its dead center position. Then upon removal of the cover 156 from the blower casing 146, the engine may be raised and moved slightly to the left (Fig. 1), whereupon the rotor 44 of the blower will be brought into alignment with the opening 148 in the blower shroud and the engine may then be shifted sidewardly (to the left, Fig. 4) to remove it completely from the heater unit. The engine may, of course, be replaced by performing the above described operation in reverse order.

It will be noted from Fig. 8 that the hinged cover 36 is provided with a screened opening 170 which, when the cover is in lowered position, is near the blower inlet opening 172 to screen the air drawn into the blower.

*Modified engine clamping mechanism*

In Figs. 9 and 10, there is disclosed a modified form of apparatus for securing the engine in position on the chassis. Such parts of the apparatus as correspond to those previously described, have had similar reference characters applied thereto.

In this embodiment, a pair of brackets 350 are secured to plates 352, which are supported by the channels 60. A clamping bail 354 has its ends pivotally connected to the brackets 350 and has its cross piece 356 embraced by a bearing yoke 358, the latter being secured to a toggle bracket 360. This bracket 360 is generally inverted U-shaped, and has a pair of sidewardly extending arms 362 provided with sockets on their lower faces for engagement with acorn nuts 364 threaded over the ends of cylinder head studs.

Oppositely extending arms 363 engage the ends of cylinder head studs 366.

As will be clearly apparent from Fig. 9, the axis of the cross piece 356 of the bail must pass through a dead center position in moving to and from locking position. In swinging the bail 354 into locking position, the sockets in the arms 362 are first engaged with the acorn nuts 364 and the bail is then pushed to the right (Fig. 9) through its dead center position, the member 360 acting in the manner of a toggle, while the arms of the bail 354 spring sufficiently to permit such movement through dead center position. Upon passing dead center position, the toggle member 360 will be swung into position to cause its arms 363 to engage the studs 366. When in this position, the bail 354 will be substantially flexed from its normal shape, and the bail will therefore exert a substantial downward force, tending to hold the engine in place.

Operation

The apparatus of the invention is, as previously indicated, adapted for use at airports and landing fields, in preheating airplane engines and cabins prior to take-off. It of course has many other uses in thawing out various kinds of machines and equipment, and also for providing heat to various structures requiring heat.

Having trundled or pulled the apparatus to the equipment or structure desired to be heated, the operator, checking to see that all the fuel valves are open, will crank the engine, whereupon the fuel pump thereof will force the fuel to the nozzle 130 in a fine atomized spray. The spark plug 134 is preferably connected in series with the engine spark plug, so that each time the engine fires a spark will be produced at the spark plug 134 to ignite the atomized fuel and air mixture. Having been ignited, combustion will ordinarily continue uninterruptedly. However, should the flame become extinguished, the spark plug, operating substantially continuously, will immediately cause reignition.

The ventilating air flowing through the heat exchanger is discharged through one or both of the flexible heated air conduits 48 which may be connected to supply air through an aperture in the cowl or nacelle of the airplane engine, or may be secured to the structure of any other part to which heat is to be delivered.

The blower operates to force the ventilating air into the heat exchanger at a relatively high velocity, so that not only is the heat transfer efficiently accomplished, but the flow through the flexible conduits 48 is maintained at a high velocity and the air discharged from the nozzles at the end thereof will have sufficient kinetic energy to flow between and around machine parts and rapidly heat the latter to the desired temperature.

Whenever it is found desirable or necessary to remove the engine, this can be accomplished in a few seconds merely by disconnecting the fuel line coupling connections 102 and 124, disconnecting conductor 132 from the spark plug 134, and swinging the bail 78 to engine releasing position. Thereafter, upon removing the blower cover plate 156, the engine may be raised from its locating dowel pins 66 sufficiently to bring the blower rotor 44 in alignment with the opening 148, whereupon the engine may be moved sidewardly (toward the left, Fig. 4) and thus easily removed from the assembly. The fact that the hood 36 may be swung clear, as shown in Fig. 8, simplifies the operation of removing the engine.

An engine in proper operating condition, together with its blower rotor 44, may then quickly and easily be secured in operating position in the apparatus by performing the above described operations in reverse order.

The storage space for the flexible ducts 48 is provided by the space between the fuel tank 50 and the bottom wall 32, thus avoiding the necessity for providing additional housings or casings for the storage of these ducts.

While we have shown and described particular embodiments of our invention, it will be apparent that numerous variations and modifications thereof may be made without departing from the underlying principles of the invention. We therefore desire, by the following claims, to include within the scope of our invention, all such variations and modifications by which substantially the results of our invention may be obtained through the use of substantially the same or equivalent means.

We claim:

1. In a unit heater of the type employing a hermetically sealed combustion unit and an engine operated blower for supplying combustion and ventilating air to said combustion unit, the combination of a chassis having means cooperable with the base of the engine for locating the latter with respect to the chassis, a resilient bail having its arms pivoted to the chassis adjacent the base of the engine, and means pivotally connected to the cross piece of said bail and engageable with parts at the top of the engine, said last named means including elements having, together with said bail, a toggle effect resiliently to clamp the engine to the chassis.

2. In a unit heater of the type employing a hermetically sealed combustion unit and an engine operated blower for supplying combustion and ventilating air to said combustion unit, the combination of a chassis having dowel means cooperable with the engine for locating the latter with respect to the chassis, a bail having its arms pivoted to the chassis adjacent the base of the engine, and means pivotally connected to the cross piece of said bail and engageable with parts at the top of the engine, said last named means including elements being formed, and having, together with said bail, sufficient resiliency to produce a toggle effect thereby resiliently to clamp the engine to the chassis.

3. In a portable self-contained heating unit having combustion and heat exchange means, a blower comprising a rotor and casing for supplying combustion and ventilating air to said combustion and heat exchange means, an internal combustion engine having a drive shaft secured to the rotor of said blower, means for clamping said engine and blower rotor in position whereby said rotor of the blower is in operative location within said casing, a removable panel forming part of said blower casing and adapted when removed to permit removal of said engine with the rotor of the blower attached thereto, a source of fuel for said combustion and heat exchange means and said engine, a fuel pump operated by said engine, and quick-detachable conduit connections between said source and said fuel pump and between said fuel pump and said combustion and heat exchange means.

4. In a portable self-contained heating unit having combustion and heat exchange means, a blower comprising a rotor and casing for supplying combustion and ventilating air to said combustion and heat exchange means, an internal combustion engine having a drive shaft secured to the rotor of said blower, means for clamping said engine and blower rotor in position whereby said rotor is in operative location within said casing, and a removable panel forming part of said blower casing and adapted when removed to permit removal of said engine with the rotor of the blower attached thereto.

5. In a portable self-contained heating unit having combustion and heat exchange means, a blower comprising a rotor and casing for supplying ventilating air to said heat exchange means, an internal combustion engine having a drive shaft secured to the rotor of said blower, means for clamping said engine and blower rotor in position whereby said rotor is in operative location within said casing, and a removable panel forming part of said blower casing and adapted when removed to permit removal of said engine with the rotor of the blower attached thereto.

6. In a portable self-contained heating unit having combustion and heat exchange means, an engine and a blower operated thereby for supplying ventilating air to said heat exchange means, a chassis having means co-operable with the base of the engine for locating the latter with respect to the chassis, a resilient bail having its arms pivoted to the chassis adjacent the base of the engine, and over-center toggle means co-operating with said bail and the upper portion of said engine for causing said bail when said over-center toggle mechanism is in one position resiliently to clamp the engine to the chassis.

7. In a unit heater of the type described the combination called for in claim 6 in which the engine is an internal combustion engine having a drive shaft secured to the rotor or said blower, a casing for said rotor, a removable panel forming part of said blower casing and adapted when removed to permit removal of said engine with the rotor of the blower attached thereto.

JOHN H. LESLIE, II.
GEORGE A. CROSBY.

REFERENCES CITED

The following references are of record in the file of this patent:

UNITED STATES PATENTS

| Number | Name | Date |
| --- | --- | --- |
| D. 135,577 | Holthouse | Apr. 27, 1943 |
| 1,519,673 | Doble | Dec. 16, 1924 |
| 1,779,129 | Heckman | Oct. 21, 1930 |
| 2,106,530 | Kelly | Jan. 25, 1938 |
| 2,235,967 | Sunday | Mar. 25, 1942 |
| 2,295,177 | King | Sept. 8, 1942 |
| 2,310,274 | Beckett | Feb. 9, 1943 |
| 2,355,631 | Carter | Aug. 15, 1944 |
| 2,405,427 | Holthouse | Aug. 6, 1946 |

FOREIGN PATENTS

| Number | Country | Date |
| --- | --- | --- |
| 39,895 | Netherlands | Jan. 15, 1937 |